(No Model.)
T. CRISPIN.
CENTRICYCLE OR BICYCLE.
No. 333,448. Patented Dec. 29, 1885.
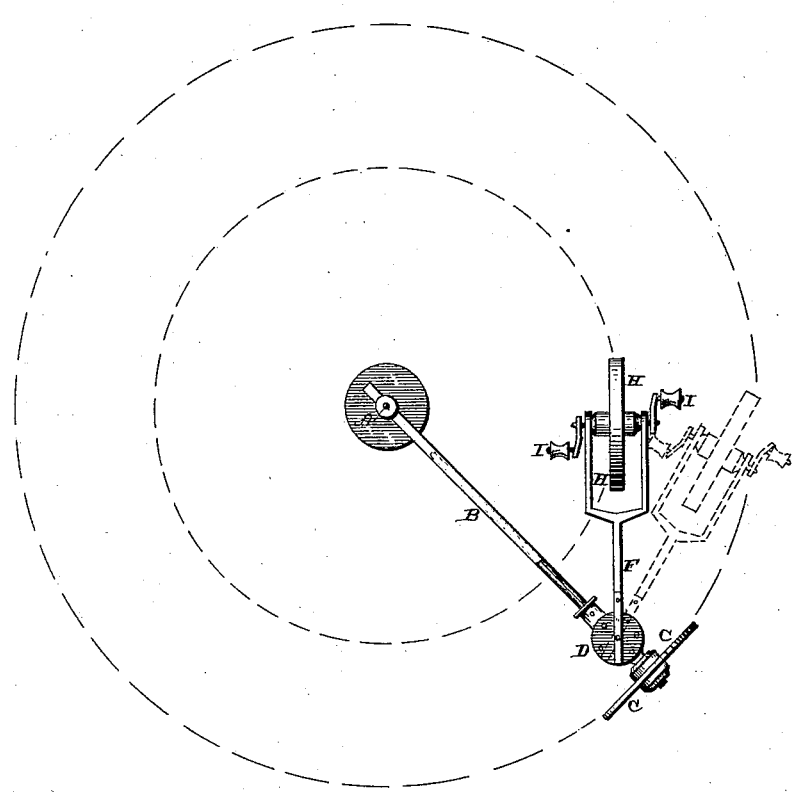

UNITED STATES PATENT OFFICE.

THOMAS CRISPIN, OF DETROIT MICHIGAN.

CENTRICYCLE OR BICYCLE.

SPECIFICATION forming part of Letters Patent No. 333,448, dated December 29, 1885.

Application filed March 17, 1885. Serial No. 159,189. (No model.)

*To all whom it may concern:*

Be it known that I, THOMAS CRISPIN, of Detroit, in the county of Wayne and State of Michigan, have invented certain new and useful Improvements in Centricycles or Bicycles; and I do hereby declare the following to be a full, clear, and exact description of the invention, such as will enable others skilled in the art to which it pertains to make and use it, reference being had to the accompanying drawing, which forms part of this specification.

My invention relates to an improvement in centricycles or bicycles; and it consists in the combination of the central rod, which is connected to a pivot at its center and to a wheel at its outer end, with the connecting-rod and front wheel of the bicycle, to which the cranks are applied, the rear end of the connecting-rod being made adjustable, so that the front wheel can be made to move in a larger or smaller circle around the pivot, as may be preferred, all of which will be more fully described hereinafter.

The object of my invention is to connect the bicycle to a pivot around which it is made to revolve, the front wheel of which can be made to move in a small or large circle, as may be preferred, and which is so supported that it cannot be upset.

The accompanying drawing is a plan view of the bicyle embodying my invention.

A represents a suitable pivot, to which the rod B is loosely connected. This rod is intended to sweep around through a circle, and for the purpose of increasing or decreasing the size of the circle, according to the size of the room or the place in which the bicycle has to be used, the rod is made in sections which telescope into each other, so as to be adjustable in length. The outer end of this rod is supported by a wheel, C, of any suitable size, and just inside of this wheel is secured upon the top of the rod a perforated plate, D, to which the rear end of the reach or connecting-rod F is pivoted. Holes are made through the plate, so that the reach can be turned at any desired angle to the rod B and fastened in that position. By thus changing the angle of the reach to the rod B the front wheel, H, of the bicycle, and to which the cranks I are applied, can be made to run in a larger or smaller circle around the central pivot, as may be preferred. The perforated plate forms a solid bearing for the rear end of the rod, and thus prevents any possibility of the front wheel upsetting. When the reach and the rod B are connected together at an angle, as here shown, the front wheel is made to move in a much smaller circle than the rear wheel, C. When it is desired to increase the size of the circle through which the front wheel is to revolve, the reach will be turned outward at a greater angle to the rod B, according to the size of the circle through which the front wheel is to move. This bicycle is especially intended for use in houses and for the use of children.

I am aware that a roundabout has heretofore been made which consists of a beam secured to a central pivot, a saddle-bar pivoted to said beam at its end and supported upon a wheel which is operated by the rider by means of cranks; and this I disclaim.

I am also aware that a toy velocipede has been connected to a central clock-work by means of a connecting-rod, so as to be made to run around in a circle; and this I also disclaim.

Having thus described my invention, I claim—

1. The combination of the pivot, the rod B, wheel C, secured to the outer end of and supporting the rod, the bearing-plate, the rod F, and the wheel H, provided with the cranks I, substantially as shown.

2. The combination of the pivot, the rod B, made in the telescopic sections, wheel C, the perforated pivotal or bearing plate, the rod F, and wheel H, provided with cranks I, substantially as described.

3. The combination of the rod B, supported by a pivot at one end and a wheel at the other, with the perforated bearing plate, which is carried by the rod, and the rod F, wheel H, and cranks I, the rod F being adjustable upon the plate at its inner end, so as to cause the wheel H to describe a larger or a smaller circle, as may be desired.

In testimony whereof I affix my signature in presence of two witnesses.

THOMAS CRISPIN.

Witnesses:
 DESIRE B. WILLEMIN,
 LEE C. WATSON.